US006978929B2

(12) United States Patent
Buie et al.

(10) Patent No.: US 6,978,929 B2
(45) Date of Patent: Dec. 27, 2005

(54) SYSTEMS AND METHODS FOR PROVIDING MAIL ITEM RETRIEVAL

(75) Inventors: James W. Buie, Baltimore, MD (US); William Tartal, Baltimore, MD (US); Janet L. Webster, Spotsylvania, MD (US)

(73) Assignee: The United States Postal Service, Washington, DC (US)

( * ) Notice: Subject to any disclaimer, the term of this patent is extended or adjusted under 35 U.S.C. 154(b) by 0 days.

(21) Appl. No.: 10/311,742

(22) PCT Filed: Jun. 19, 2001

(86) PCT No.: PCT/US01/19421

§ 371 (c)(1),
(2), (4) Date: Jul. 28, 2003

(87) PCT Pub. No.: WO01/99037

PCT Pub. Date: Dec. 27, 2001

(65) Prior Publication Data

US 2004/0039712 A1    Feb. 26, 2004

Related U.S. Application Data

(60) Provisional application No. 60/212,596, filed on Jun. 19, 2000, provisional application No. 60/255,407, filed on Dec. 15, 2000.

(51) Int. Cl.$^7$ ............................................... G06K 5/00
(52) U.S. Cl. ...................... 235/382; 235/381; 235/385; 705/26
(58) Field of Search ................................ 235/380, 375, 235/383, 381, 385, 382; 705/26

(56) References Cited

U.S. PATENT DOCUMENTS

| 4,135,662 A | 1/1979 | Dlugos |
| 4,309,569 A | 1/1982 | Merkle |
| 4,574,352 A | 3/1986 | Coppola et al. |
| 4,725,718 A | 2/1988 | Sansone et al. |
| 4,727,368 A | 2/1988 | Larson et al. |
| 5,043,908 A | 8/1991 | Manduley et al. |
| 5,136,646 A | 8/1992 | Haber et al. |

(Continued)

FOREIGN PATENT DOCUMENTS

EP    0 516 898 A1    12/1992

(Continued)

OTHER PUBLICATIONS

Campbell et al., "Systems and Methods for Authenicating an Electronic Message," Pending U.S. Appl. No. 09/675,667, filed Sep. 29, 2000.

(Continued)

*Primary Examiner*—Karl D. Frech
(74) *Attorney, Agent, or Firm*—Finnegan, Henderson, Farabow, Garrett & Dunner, L.L.P.

(57) ABSTRACT

A method and system for delivering an item to a customer including the processing of a plurality of items and notifying a customer (304) of an item that has been processed and is ready for delivery. When the customer requests the item, the system and method receives item information and customer information and based on this information identifies the customer (408) and the item (412). Then, the system and method validates that the customer is authorized to obtain the item (414), and delivers and confirms delivery of the item to the customer.

31 Claims, 4 Drawing Sheets

U.S. PATENT DOCUMENTS

| | | | |
|---|---|---|---|
| 5,136,647 | A | 8/1992 | Haber et al. |
| 5,223,829 | A | 6/1993 | Watabe |
| 5,373,561 | A | 12/1994 | Haber et al. |
| RE34,954 | E | 5/1995 | Haber et al. |
| 5,638,446 | A | 6/1997 | Rubin |
| 5,701,770 | A | 12/1997 | Cook et al. |
| 5,710,887 | A | 1/1998 | Chelliah et al. |
| 5,774,053 | A | 6/1998 | Porter |
| 5,781,629 | A | 7/1998 | Haber et al. |
| 5,857,188 | A | 1/1999 | Douglas |
| 5,878,233 | A | 3/1999 | Schloss |
| 5,917,411 | A | 6/1999 | Baggarly |
| 5,917,925 | A | 6/1999 | Moore |
| 5,943,656 | A | 8/1999 | Crooks et al. |
| 5,971,587 | A | 10/1999 | Kato et al. |
| 5,979,750 | A | 11/1999 | Kindell |
| 6,006,200 | A | 12/1999 | Boies et al. |
| 6,028,517 | A | 2/2000 | Sansone et al. |
| 6,035,402 | A | 3/2000 | Vaeth et al. |
| 6,047,264 | A | 4/2000 | Fisher et al. |
| 6,064,995 | A | 5/2000 | Sansone et al. |
| 6,138,910 | A | 10/2000 | Madruga |
| 6,152,369 | A | 11/2000 | Wilz et al. |
| 6,219,669 | B1 | 4/2001 | Haff et al. |
| 6,233,565 | B1 | 5/2001 | Lewis et al. |
| 6,243,620 | B1 | 6/2001 | Robinson et al. |
| 6,246,925 | B1 | 6/2001 | Robinson et al. |
| 6,259,964 | B1 | 7/2001 | Robinson |
| 6,285,991 | B1 | 9/2001 | Powar |
| 6,289,323 | B1 | 9/2001 | Gordon et al. |
| 6,323,782 | B1 | 11/2001 | Stephens et al. |
| 6,347,737 | B1 | 2/2002 | Madruga |
| 6,442,571 | B1 | 8/2002 | Haff et al. |
| 6,446,045 | B1 * | 9/2002 | Stone et al. .................. 705/26 |
| 2001/0032181 | A1 | 10/2001 | Jakstadt et al. |
| 2002/0049672 | A1 | 4/2002 | Kitchen et al. |
| 2003/0077409 | A1 | 4/2003 | Schnell |

FOREIGN PATENT DOCUMENTS

| | | |
|---|---|---|
| WO | WO 97/12460 | 4/1997 |
| WO | WO 00/13368 | 3/2000 |
| WO | WO 01/00069 A2 | 1/2001 |
| WO | WO 01/18718 A1 | 3/2001 |
| WO | WO 01/65444 A1 | 9/2001 |
| WO | WO 01/99005 A1 | 12/2001 |
| WO | WO 01/99009 A2 | 12/2001 |
| WO | WO 02/08961 A1 | 1/2002 |
| WO | WO 02/21315 A1 | 3/2002 |
| WO | WO 02/066344 A1 | 8/2002 |
| WO | WO 02079947 A2 | 10/2002 |
| WO | WO 03/023677 A1 | 3/2003 |

OTHER PUBLICATIONS

Campbell et al., "Methods and Systems for Proofing Identities Using a Certificate Authority," Pending U.S. Appl. No. 09/809,325, filed Mar. 16, 2001.

Orbke et al., "Methods and Systems for Establishing an Electronic Account for a Customer," Pending U.S. Appl. No. 09/809,325, filed Mar. 16, 2001.

Cook et al., "Methods and Systems for Providing a Secure Electronic Mailbox," Pending U.S. Appl. No. 09/809,312, filed Mar. 16, 2001.

Campbell et al., "Methods and Systems for Providing and Electronic Account to a Customer," Pending U.S. Appl. No. 09/809,581, filed Mar. 16, 2001.

Cook et al., "Methods and Systems for Linking an Electronic Address to a Physical Address of a Customer," Pending U.S. Appl. No. 09/809,326, filed Mar. 16, 2001.

Replacement Sheet for p. 1 of international application No. PCT/US01/19698 (published as WO 01/99009 A2) submitted, on Jan. 18, 2002.

International Search Report, PCT/US00/27068, mailed May 4, 2001 (4 pages).

International Search Report in PCT/US01/23177, mailed Oct. 18, 2001 (4 pages).

International Search Report in PCT/US01/19384, mailed Nov. 16, 2001 (6 pages).

International Search Report in PCT/US01/19421, mailed Nov. 19, 2001 (6 pages).

International Search Report in PCT/US01/27690, mailed Nov. 19, 2001 (5 pages).

International Search Report in PCT/US01/28001, mailed Dec. 21, 2001 (7 pages).

International Search Report in PCT/US01/08490, mailed Jan. 22, 2002 (6 pages).

International Search Report in PCT/US02/04866, mailed May 23, 2002 (1 page).

International Search Report in PCT/US02/09870, mailed Dec. 5, 2002 (2 pages).

International Preliminary Examination Report in PCT/US01/08487, mailed Jan. 23, 2002 (4 pages).

International Preliminary Examination Report in PCT/US01/23177, mailed May 3, 2002 (4 pages).

International Preliminary Examination Report in PCT/US01/19421, mailed May 16, 2002 (4 pages).

International Preliminary Examination Report in PCT/US01/19384, mailed Jan. 17, 2003 (4 pages).

International Preliminary Examination Report in PCT/US01/08488, mailed Jun. 11, 2003 (10 pages).

International Preliminary Examination Report in PCT/US01/28001, mailed Aug. 8, 2003 (4 pages).

PCT Written Opinion (PCT Rule 66) in PCT/US01/19384, mailed Jun. 17, 2002 (4 pages).

PCT Written Opinion (PCT Rule 66) in PCT/US01/08488, mailed Oct. 28, 2002 (9 pages).

PCT Written Opinion (PCT Rule 66) in PCT/US02/09870, mailed Mar. 6, 2003 (5 pages).

PCT Written Opinion (PCT Rule 66) in PCT/US02/04866, mailed May 23, 2003 (4 pages).

Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002.

Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Bartholomew, D., "The Future of Snail Mail: the Postal Service Is Gearing up for Competition. But Can It Deliver?," InformationWeek, Dec. 4, 1995, starting p. 34, retrieved from DIALOG, DIALOG No.: 08306634 (6 pages).

Bhushan, B. et al., "Federated Accounting: Service Charging and Billing in a Business-to-Business Environment," 2001 IEEE/IFIP International Symposium, May 14-18, 2001, pp. 107-121.

"CONNECT announces OneServer interactive online applicaton platform," Business Wire, Apr. 10, 1995, p. 4101043, retrieved from DIALOG, DIALOG No.: 07797909 (2 pages).

Czerny, M., "Customer Account Management System for STEWEAG Key Accounts," CIRED 97 Conference Publication No. 438, Jun. 2-5, 1997, pp. 5.6.1 to 5.6.5.

eBusiness Tools, FedEx® Ship Manager Software [online], pp. 1-2, FedEx® [retrieved on Nov. 28, 2001]. Retrieved from the Internet: <URL: www.fedex.com/us/ebusiness/eshipping/ship.html>.

Fast Facts, Back Issue [online], pp. 1-4, FedEx® Oct. 11, 2000 [retrieved on Nov. 28, 2001]. Retrieved from the Internet: <URL: www.fedex.com/us/customer/fastfacts/backissues/101100fastfacts.html>.

"Joint Direct Bill Payment Form for Mich. Utilities," Bank Technology News, Apr. 1994, p. 8, retrieved from DIALOG, DIALOG No. 03302326 (1 page).

Newkirk, K.M., "Banks Can Slice Transaction Costs," Independent Banker, Dec. 1995, vol. 45, No. 12, pp. 52-53, retrieved from DIALOG, DIALOG No.: 00276769 (3 pages).

Selected pp. (9-11, 18-19, 28-32) from "Recommendation F.400/X.400 Message Handling and Directory Services—Operation and Definition of Service," Nov. 14, 1988, CCITT, Melbourne, XP002186347 (10 pages).

Stafford, C.D. et al., "Delivering Marketing Expertise to the Front Lines," IEEE Expert, Apr. 1994, pp. 23-32.

* cited by examiner

SYSTEMS AND METHODS FOR PROVIDING MAIL ITEM RETRIEVAL

RELATED APPLICATION

Under provisions of 35 U.S.C. § 119(e), the Applicant claims the benefit of U.S. provisional application Ser. No. 60/212,596, filed Jun. 19, 2000, and U.S. provisional application Ser. No. 60/255,407, filed Dec. 15, 2000, which are hereby expressly incorporated herein by reference.

DESCRIPTION OF THE INVENTION

1. Technical Field

The present invention relates to item notification, delivery, and automated retrieval. More particularly, the present invention, which is illustrated by specific embodiments, involves methods and systems for notifying a recipient of an item to be retrieved from a mail service office and either providing automated means for retrieving the mail item, or delivering the item to the desired address.

2. Background

The United States Postal Service (USPS) is an independent government agency that provides mail delivery and other services to the public. The USPS is widely recognized as a safe and reliable means for sending and receiving mail and other items. With the increase in electronic commerce, the physical mail stream has increased as e-commerce companies utilize the USPS for sending and receiving items.

Due to the fact that many item recipients are not at home when an item is delivered or that the item could not be left at the redipient's address, recipients may need to physically visit a mail service location, such as a post office, in order to obtain an item. For example, a recipient may be required to go to a mail service office to pick up the item if the item was too large for the recipient's mail box or if the sender required personal delivery and the attempted delivery was when the recipient was not at home.

Currently, the USPS and other mail service providers provide a notification at the recipient's address indicating that the recipient should visit their local office to retrieve the item or arrange for another delivery when the recipient anticipates that they will be home. This method and system for item delivery is inefficient because the recipient has to either make a special trip to the local office to retrieve the item or the delivery service must make a second trip to the delivery address to deliver the item. Furthermore, if the recipient is not at home when the second delivery is attempted, then subsequent arrangements, similar to those described above, must be made for delivery or retrieval of the item.

Thus, there remains a need for efficiently providing item notification, delivery, and retrieval in an item delivery system.

SUMMARY OF THE INVENTION

In accordance with the current invention, an item notification and delivery method and system are provided that avoid the problems associated with prior art item notification and delivery systems as discussed herein above.

In one aspect, a method for delivering an item to a customer consistent with the present invention comprises processing a plurality of items; notifying a customer of an item that has been processed and is ready for delivery; receiving item information and customer information from the customer requesting to receive the item; identifying the customer based on the customer information received from the customer; identifying the item based on the item information received from the customer; validating that the customer is authorized to obtain the item; delivering the item to the customer, if the customer is authorized to obtain the item; and confirming delivery of the item.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Reference will now be made to various embodiments according to this invention, examples of which are shown in the accompanying drawings and will be obvious from the description of the invention. In the drawings, the same reference numbers represent the same or similar elements in the different drawings whenever possible.

Introduction

A mail item retrieval system (MIRS), consistent with the present invention, improves mail provider service by automating a process currently for storing and retrieving undelivered mail items (UMIs), such as certified mail, CODs, and held mail. A self-service MIRS enhances customer convenience, both during and after business hours, reduces delivery operation expenses, and may also increase the number of packages available at a given facility. A self-service MIRS offers customer's access to UMIs through a highly reliable, interactive, expandable and flexible operating environment.

System Operation

Figure 1:
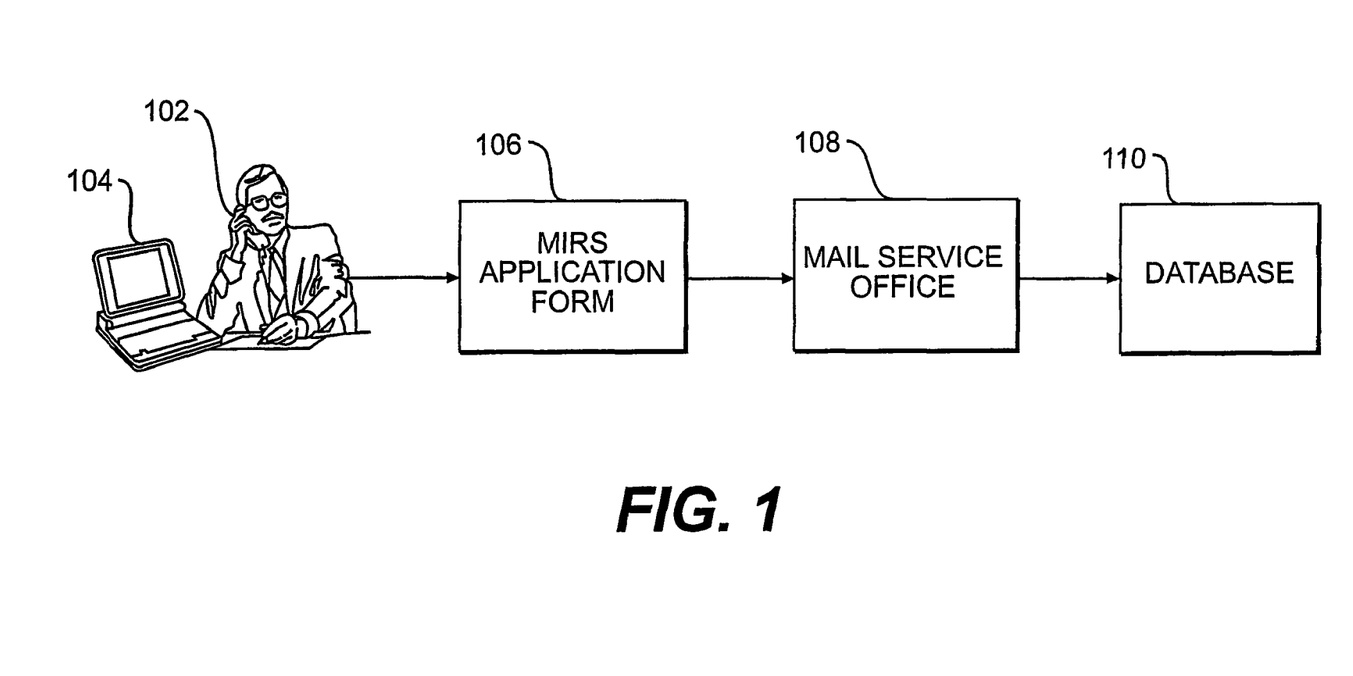
FIG. 1 is a block diagram illustrating the registration process for a customer attempting to the use the mail item retrieval system (MIRS) consistent with the present invention.

FIG. 1 is block diagram illustrating the registration process for participating in a MIRS, consistent with the present invention. To participate, a customer 102 runs an application program on a computer 104 and generates a MIRS application form 106. Once application form 106 is filled out, customer 102 delivers the form to a local mailing service office 108, for entry into a database 110 and assignment of a membership number. Form 106 may also be transmitted electronically in connection with appropriate validation and security measures.

Figure 2:
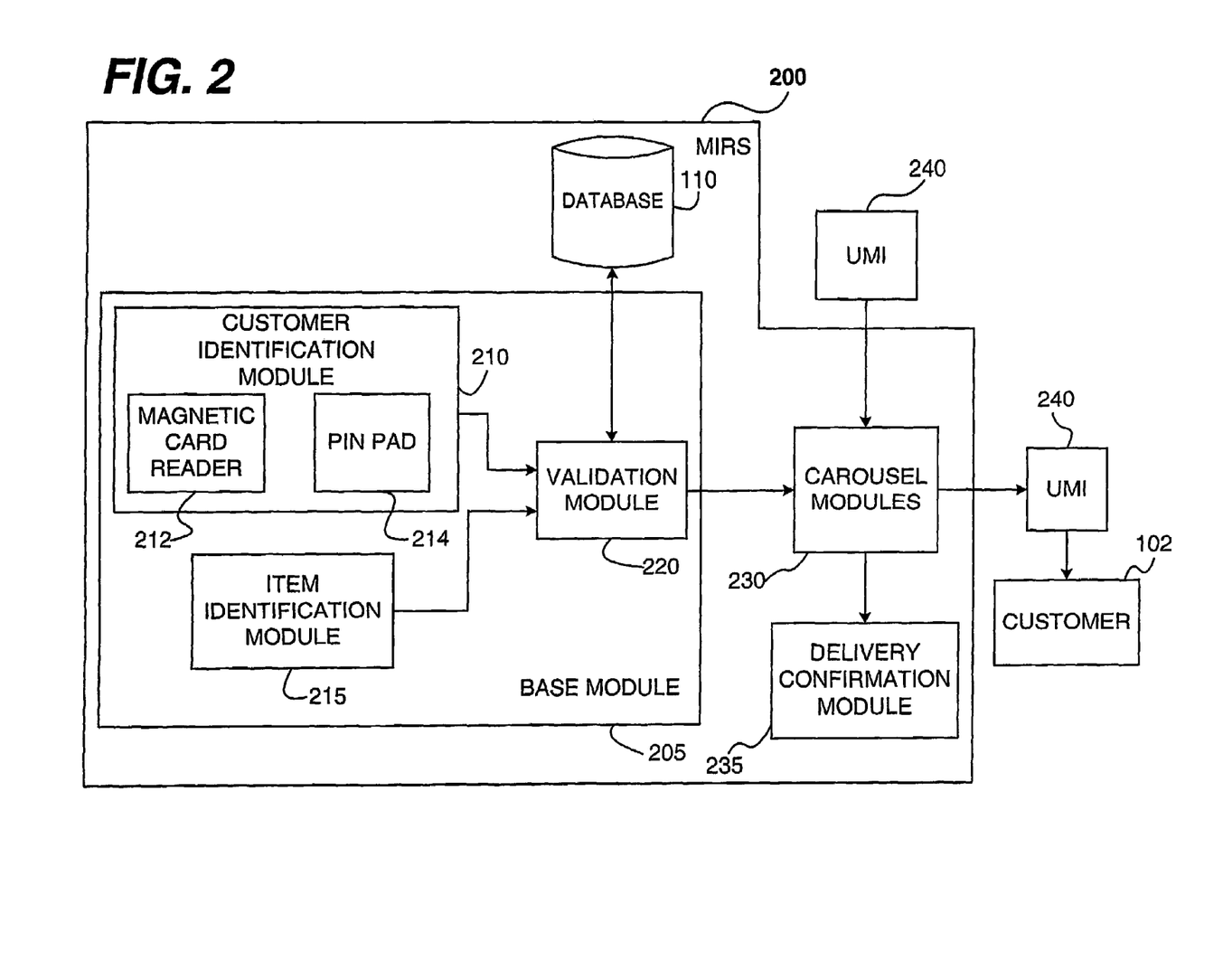
FIG. 2 is a system layout illustrating an exemplary embodiment of the MIRS consistent with the present invention.

FIG. 2 illustrates a mail retrieval system (MIRS) 200 consistent with the present invention. MIRS 200 is of modular design and incorporates a base module 205, which includes a customer identification module 210 and an item identification module 215. MIRS 200 further includes a validation module 220, database 110, one or more carousel modules 230, and a delivery confirmation module 235. Modules 205–235 may comprise hardware, software, or a combination of both.

MIRS 200 operates by storing undelivered mail items (UMIs) in one or more carousel modules 230 and delivering the UMIs to an appropriate customer 102. The UMIs may be automatically retrieved by customer 102 after proper validation by the validation module 220. To retrieve UMIs from the MIRS 200, customer 102 must identify him or herself by, for example, providing a magnetic ID card, such as an ATM card, to the customer identification module 210, which reads verification information including the customer's name from the magnetic card via a magnetic card reader 212. Once a customer's name has been retrieved, customer identification module 210 may also require customer 102 to provide further verification information. For example, customer 102 may also be required to provide a personal identification number via a PIN pad 214.

The customer's verification information may be stored in database 110 to provide information for investigation should an unauthorized delivery occur or the verification information may be sent to validation module 220 to validate the customer's name and other verification information (e.g., personal identification number). Validation module 220 may validate the customer's identity by comparing the information provided by the customer with information stored in database 110. Database 110 may store customer names, membership numbers, and other verification information associated with each customer.

Customer 102 may also be required to validate the item to be retrieved by providing item identification information. For example, customer 102 may scan a form with a barcode that the mail service provider left at the customer's home, when it was unable to deliver the item. The barcode identifies the item attempted to be delivered. The item identification information is sent to validation module 220, which confirms whether the item identification information is valid. Validation module 220 may validate the item identification information by comparing it with existing item identification information in database 110, or validation module 220 may validate the item identification by comparing the customer's personal identification number to an identification number assigned to stored UMI 240.

If customer verification is validated and/or the item identification information is validated, validation module 220 instructs one or more carousel modules 230 to retrieve UMI 240. The one or more carousel modules 230 retrieve UMI 240 and deliver it to customer 102. The one or more carousel modules 230 may include multi-point retrieval points and contain mail item carrier shelves, each of which may have up to 6 compartment sizes.

Delivery confirmation module 135 confirms that the customer received UMI 240. Delivery confirmation module 135 may include a camera system that records an image such as a moving or still image of the customer receiving the UMI.

An operating system platform for a microprocessor and MIRS software implementing the above mentioned modules may be the LISPS approved release of Microsoft's Windows NT, which is a fully multitasking and multi-threading operating system capable of executing multiple concurrent application programs without detectable delay by the user. In one embodiment of the present invention, one or more of the software modules may be implemented using one or more microprocessors.

Methods of Operation

Figure 3:
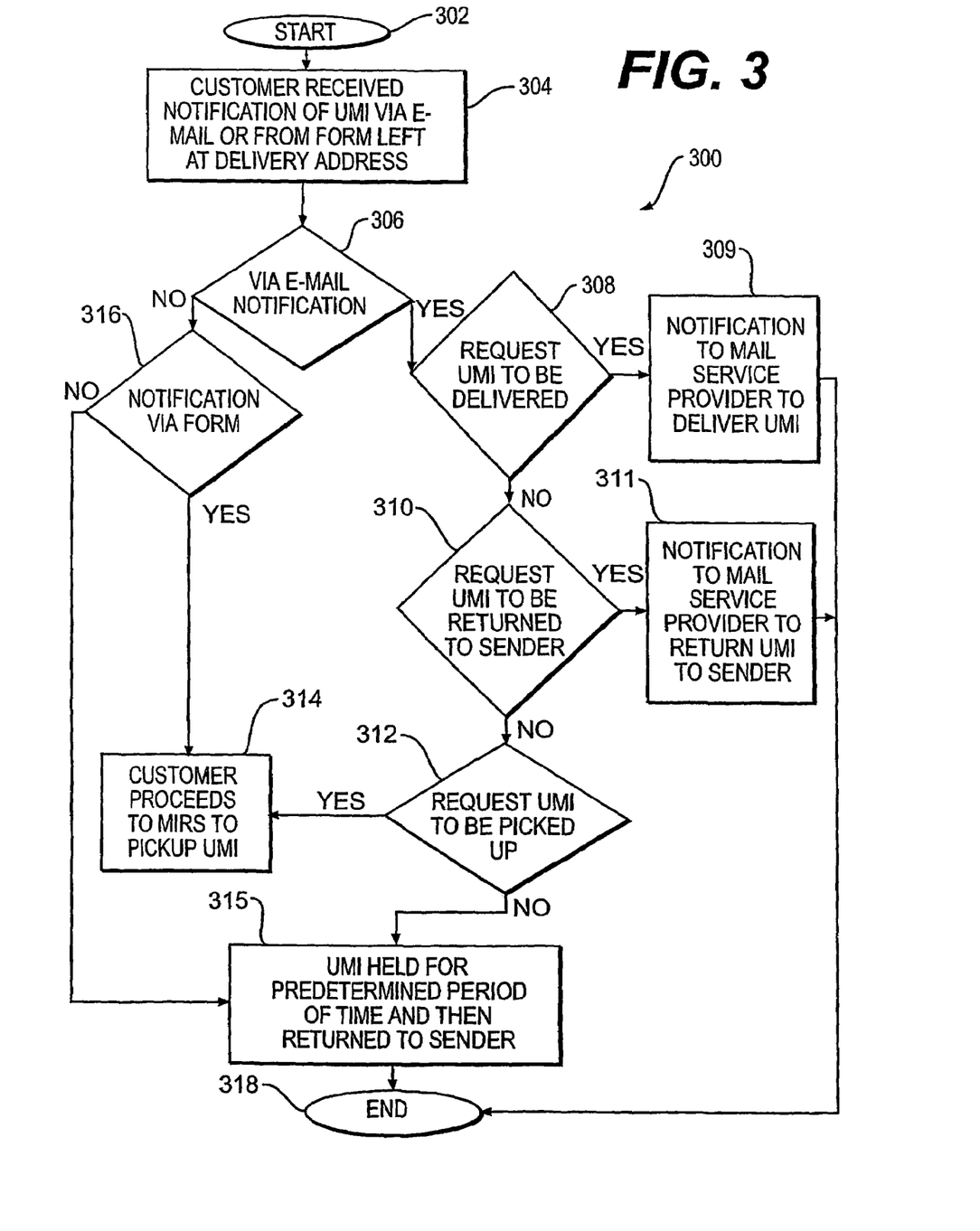
FIG. 3 is a flow chart of an exemplary method for retrieving an undelivered mail item consistent with the present invention.

FIG. 3 is a flowchart of an exemplary method 300, consistent with the present invention, for retrieving stored UMI 240. Method 300 starts and customer 102 receives notification of UMI 240 via a form with a barcode left at a delivery address and/or via e-mail from MIRS 200. (Stage 302 and 304). If the notification is received via e-mail, customer 102, via return e-mail, may request UMI 240 to be delivered to the delivery address. (Stage 306 and 308). If customer 102 decides to have UMI 240 delivered to the delivery address, MIRS 200 provides the appropriate notification to the mail service provider for UMI 240 to be physically delivered to customer 102 and method 300 ends. (Stage 309 and 318).

If customer 102 decides not to have the item delivered, customer 102 may decide to have UMI 240 returned to the sender. (Stage 310). If customer 102 decides to return UMI 240 to the sender, MIRS 200 provides the appropriate notification to the mail service provider and UMI 240 is returned to the sender and method 300 ends. (Stage 311 and 318).

However, if customer 102 decides not to have UMI 240 returned to the sender, customer 102 may decide to pickup UMI 240 at MIRS 200. (Stage 312). If customer 102 decides not to pickup UMI 240 at MIRS 200 and customer 102 has not requested that UMI 240 be delivered or returned to the sender, UMI 240 is held by MIRS 200 for a predetermined period of time and then the package is returned to the sender and method 300 ends. Alternatively, an additional notification may be sent to customer 102. (Stage 315 and 318). If customer 102 decides to pickup UMI 240, customer 102 proceeds to MIRS 200 for retrieval of UMI 240. (Stage 314).

Returning to stage 306, if customer 102 did not receive e-mail notification, customer 102 may have received a notification via a form with a barcode left at the customer's delivery address. If customer 102 decides not to pickup UMI 240, UMI 240 remains at MIRS 200 for a predetermined period of time before UMI 240 is returned to the sender and method 300 ends. (Stage 315 and 318). If customer 102 decides to pickup UMI 240, customer 102 proceeds to MIRS 200 to pickup UMI 240.

Figure 4:
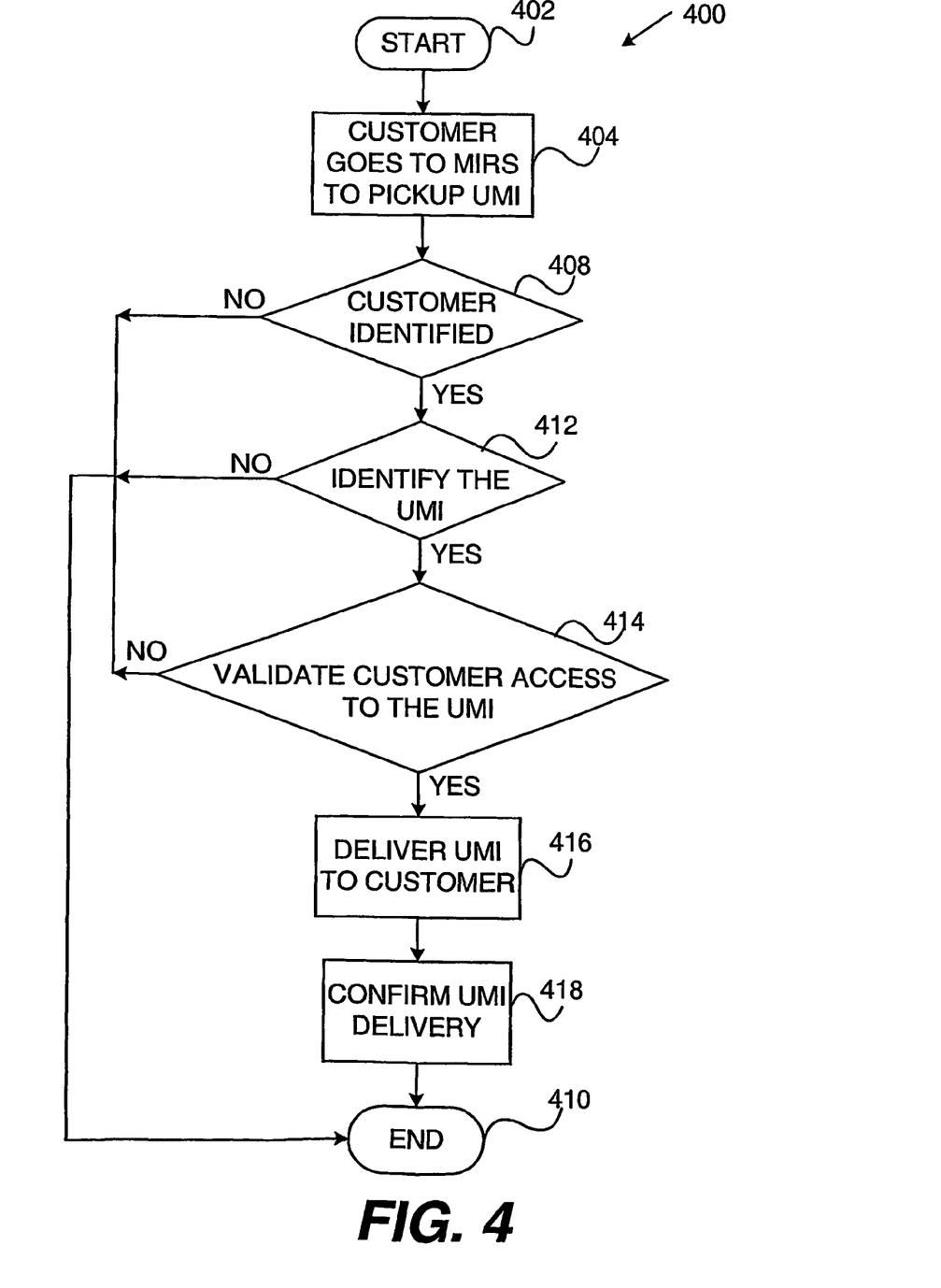
FIG. 4 is a flow chart of an exemplary method for retrieving a mail item from the MIRS consistent with the present invention.

FIG. 4 is a flowchart illustrating a method 400 for retrieving UMI 240 from MIRS 200. Method 400 is described using some of the numbered elements of FIGS. 1 and 2. Method 400 starts and customer 102 proceeds to MIRS 200 to pickup UMI 240 (stage 404). To pickup UMI 240, customer 102 is identified by, for example, providing ATM card information to customer identification module 210, which reads the customer's name from a magnetic card via magnetic card reader 212. Once a customer's name has been retrieved, customer identification module 210 may also require customer 102 to provide further verification information. For example, customer 102 may also be required to provide a personal identification number via PIN pad 214. If customer 102 is not identified, then method 400 ends. (Stage 410).

However, if customer 102 is identified, method 400 proceeds to identify UMI 240. (Stage 412). MIRS 200 identifies the item to be retrieved through item identification information provided by customer 102. For example, customer 102 may scan a form with a barcode that the mail service provider left at the customer's home when it was unable to deliver UMI 240 or UMI 240 may be identified based upon the customer's personal identification number entered via PIN pad 214. If the item is, however, not identified then method 400 ends. (Stage 410).

If the item is successfully identified, then method 400 validates the customer's access to UMI 240. (Stage 414). For validation, the item identification information is sent to validation module 220, which confirms whether the item identification information is valid. Validation module 220 may validate the item identification information by comparing it with existing item identification information in database 110, or validation module 220 may validate the item identification by comparing the customer's personal identification number to an identification number assigned to stored UMI 240. But, if method 400 is unable to validate the customer's access to the item, then method 400 ends. (Stage 410).

However, if the customer's access to UMI 240 is successfully validated, then UMI 240 is delivered to customer 102, UMI delivery is confirmed, and method 400 ends. (Stage 416, 418, and 410). The delivery confirmation may include delivery confirmation module 135 which confirms that customer 102 received the package. Delivery confirmation module 135 may include a camera system for recording the customer's receipt of UMI 240.

Delivery confirmation module 135 may also include a data exchange and handshake between MIRS 200 and a delivery confirmation system, which provides the sender of UMI 240 with a positive confirmation of delivery. The delivery confirmation system is described in greater detail in U.S. provisional application Ser. No. 60/230,788.

In view of the foregoing, it will be appreciated that the present invention provides a system and method for item notification, delivery, and retrieval. Still, it should be understood that the foregoing relates only to the exemplary embodiments of the present invention, and that numerous changes may be made thereto without departing from the spirit and scope of the invention as defined by the following claims.

We claim:

1. A method for delivering an item to a customer, comprising:
    processing a plurality of items, wherein the items are undelivered delivery items;
    notifying a customer of an item that has been processed and is ready for delivery;
    receiving item information and customer information from the customer that is requesting to receive the item;
    identifying the customer based on the customer information received from the customer;
    identifying the item based on the item information received from the customer;
    validating that the customer is authorized to obtain the item, based on the identification of the item;
    delivering the item to the customer, if the customer is authorized to obtain the item; and
    confirming delivery of the item.

2. The method of claim 1, wherein the item information includes at least one of:
    an associated delivery notice with an associated unique number;
    and a customer identification number.

3. The method of claim 2, wherein validating the customer comprises determining that the item information is consistent with at least one of:
    an associated delivery notice having an associated unique number; and
    a personal identification number.

4. The method of claim 2, wherein the associated unique number is represented by a barcode.

5. The method of claim 1, wherein identifying the customer comprises receiving identifying information from one of:
    a magnetic ID card; and
    a personal identification number.

6. The method of claim 1, wherein notifying the customer comprises delivering a delivery notice comprising a form with a barcode for item identification.

7. The method of claim 1, wherein notifying the customer comprises delivering an e-mail to the customer indicating that the item is to be delivered.

8. The method of claim 1, wherein validating that the customer is authorized to obtain the item comprises verifying that the item information is consistent with an associated delivery notice with an associated unique number.

9. The method of claim 1, wherein validating that the customer is authorized to obtain the item further comprises verifying that the item information is consistent with a personal identification number for the customer.

10. The method of claim 1, wherein delivering the item to the customer comprises requesting the item from at least one carousel and delivering the item to the customer.

11. The method of claim 1, wherein confirming delivery of the item comprises recording an image of the customer taking possession of the item.

12. A system for delivering an item to a customer, comprising:
    means for processing a plurality of items, wherein the items are undelivered delivery items;
    means for notifying a customer of an item that has been processed and is ready for delivery;
    means for receiving item information and customer information from the customer requesting to receive the item;
    means for identifying the customer based on the customer information received from the customer;
    means for identifying the item based on the item information received from the customer;
    means for validating that the customer is authorized to obtain the item, based on the identification of the item;
    means for delivering the item to the customer, if the customer is authorized to obtain the item; and
    means for confirming delivery of the item.

13. The method of claim 12, wherein the means for identifying the item information includes at least one of:
    an associated delivery notice with an associated unique number; and
    a customer identification number.

14. The method of claim 13, wherein the means for validating the customer comprises means for determining that the item information is consistent with at least one of:
    an associated delivery notice having an associated unique number; and
    a personal identification number.

15. The method of claim 13, wherein the means for identifying comprises means for identifying an associated unique number that is represented by a barcode.

16. The method of claim 12, wherein the means for identifying comprises means for receiving identifying information from one of:
    a magnetic ID card; and
    a personal identification number.

17. The method of claim 12, wherein the means for notifying the customer comprises means for delivering a delivery notice comprising a form with a barcode for item identification.

18. The method of claim 12, wherein the means for notifying the customer comprises means for delivering an e-mail to the customer indicating that an item is to be delivered.

19. The method of claim 12, wherein the means for validating that the customer is authorized to obtain the item comprises means for verifying that the item information is consistent with an associated delivery notice with an associated unique number.

20. The method of claim 12, wherein the means for validating that the customer is authorized to obtain the item further comprises means for verifying that the item information is consistent with a personal identification number for the customer.

21. The method of claim 12, wherein the means for delivering the item to the customer comprises means for requesting the item from at least one carousel and delivering the item to the customer.

22. The method of claim 12, wherein the means for confirming comprises means for taking a photograph of the customer taking possession of the item.

23. A system for delivering an item to a customer, comprising:
- a module generating a delivery notification to the customer of the availability of the item;
- a customer identification module for identifying the customer, when the customer attempts to retrieve the item;
- an item identification module for identifying the item, when the customer attempts to retrieve the item;
- a validation module for verifying that the customer is authorized to obtain the item;
- a carousel module for delivering the item to the customer after verification that the customer is authorized to obtain the item; and
- a delivery confirmation module for verifying that the customer received the item.

24. The system of claim 23, wherein the customer identification module comprises at least one of:
- a magnetic card reader; and
- and a PIN pad.

25. The system of claim 23, wherein the item identification module comprises a barcode scanner for reading a barcode on the delivery notification form that identifies the item.

26. The system of claim 23, wherein the item notification module identifies the item based on a personal identification number.

27. The system of claim 23, wherein the delivery notification comprises an e-mail sent to the customer.

28. The system of claim 27, comprising a module for receiving a customer response to the e-mail.

29. The system of claim 23, wherein the validation module verifies that the customer is authorized to receive the item based on comparing a first barcode on the delivery notification with a second barcode on the item.

30. The system of claim 23, wherein the validation module verifies that the customer is authorized to receive the item based on a personal identification number.

31. The system of claim 23, wherein the delivery confirmation is comprised of a camera for recording an image of the customer receiving the item.

\* \* \* \* \*